Patented Nov. 10, 1936

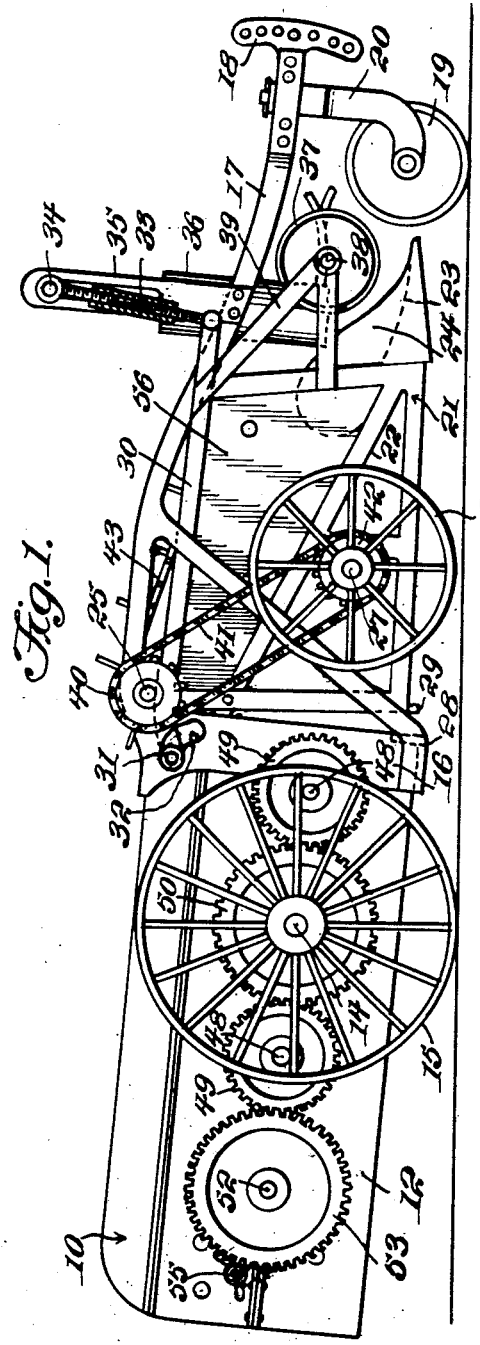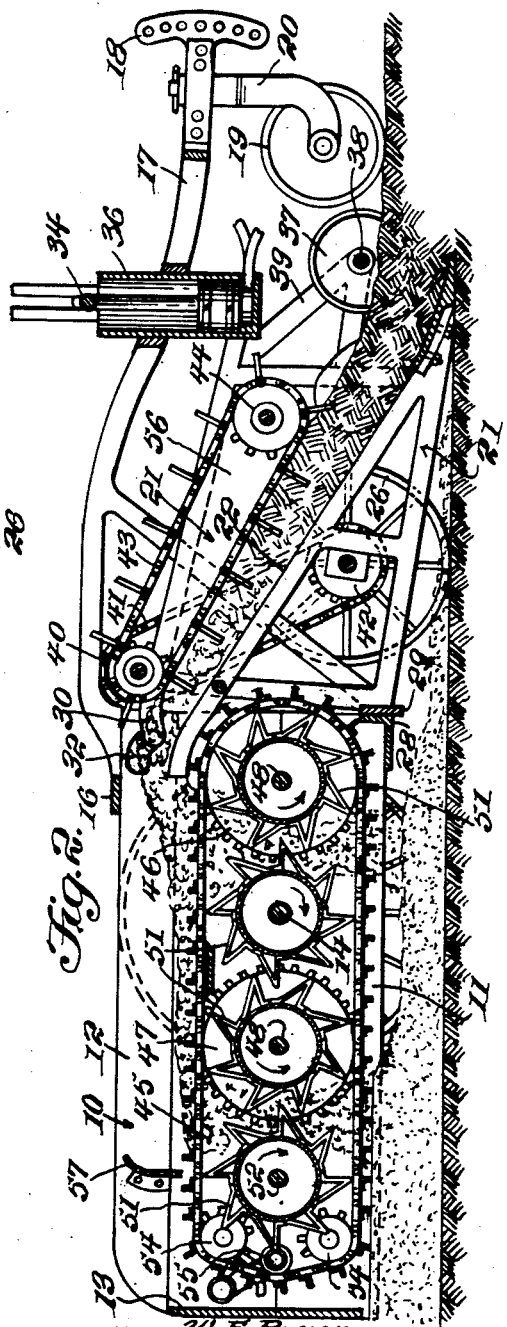

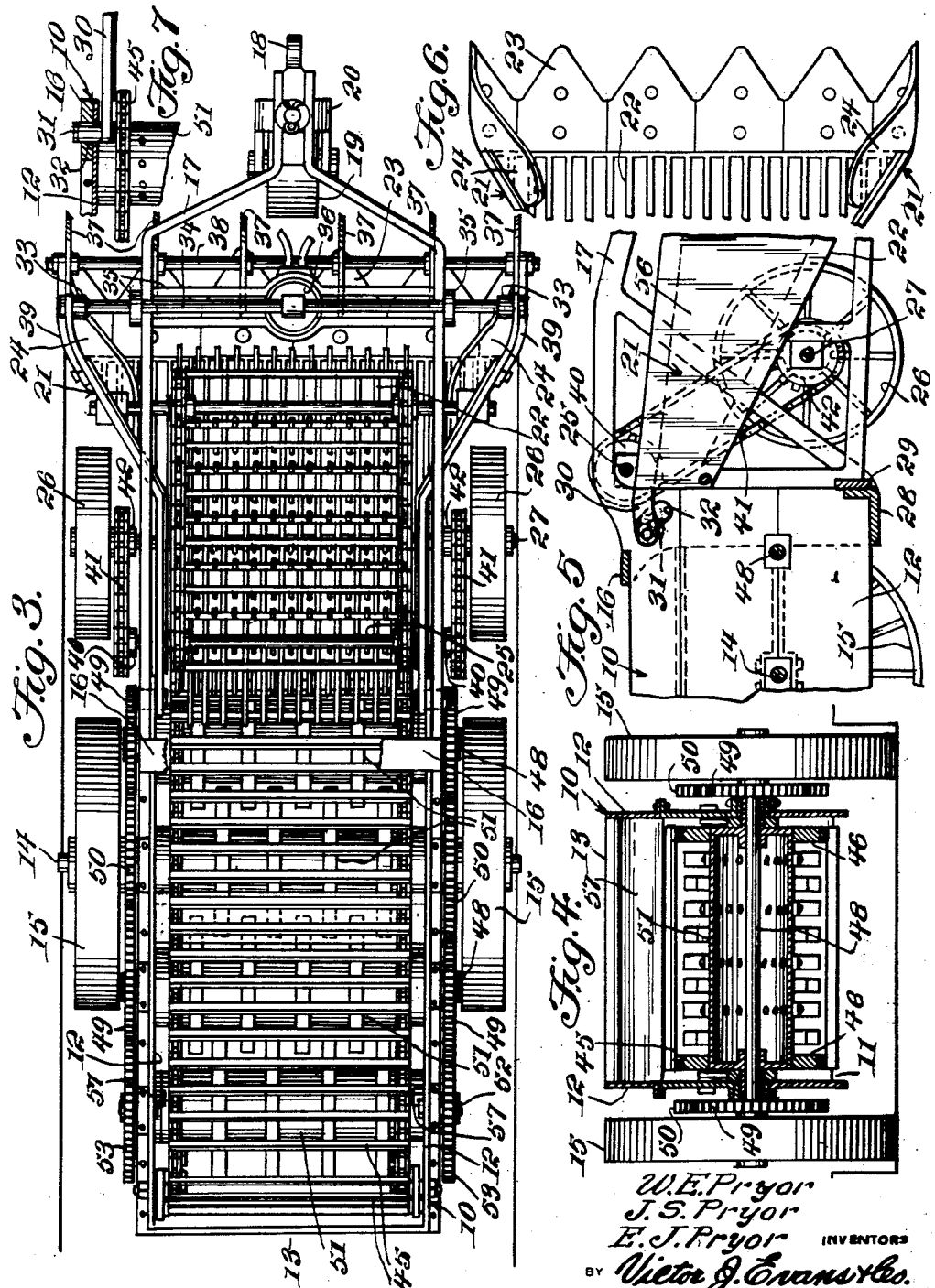

2,060,688

UNITED STATES PATENT OFFICE 2,060,688

AGRICULTURAL IMPLEMENT

William E. Pryor, James S. Pryor, and Edward J. Pryor, Yuma, Ariz.

Application March 17, 1936, Serial No. 69,376

10 Claims. (Cl. 97—10)

The invention relates to an agricultural implement or machine and more especially to a soil pulverizing machine.

The primary object of the invention is the provision of a machine of this character, wherein the same when drawn over the ground will collect earth whether dug by the machine or loose and act thereon to pulverize clods so as to condition earth for crops, particularly garden crops, the machine in its entirety being of novel construction and designed especially for use in sections where the earth is cloddy for a thorough breaking up and pulverizing of such and to avoid material, labor and other equipment or machinery for the conditioning of such earth.

Another object of the invention is the provision of a machine of this character, wherein the earth collecting scoop, shovel or the like can be raised free of the ground surface so as to enable the easy turning of the machine at points requiring such turning in the working of the soil for the pulverizing thereof.

A further object of the invention is the provision of a machine of this character, wherein when traveling once over a field the soil will be thoroughly worked or broken up for the pulverizing thereof so that such field will be immediately ready for planting.

A still further object of the invention is the provision of a machine of this character, wherein a material area of soil is acted upon under a single run or travel of the machine and such soil pulverized in the single run or travel thereof.

A still further object of the invention is the provision of a machine of this character, which is comparatively simple in its construction, thoroughly reliable and efficient in its operation, durable, mechanically operated, the pulverizing mechanism being driven under the forward travel of the machine through the traction wheels thereof and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a side elevation partly in section of a machine constructed in accordance with the invention.

Figure 2 is a vertical longitudinal sectional view thereof.

Figure 3 is a top plan view.

Figure 4 is a fragmentary vertical transverse sectional view through the machine.

Figure 5 is a fragmentary longitudinal sectional view showing certain details.

Figure 6 is a fragmentary plan view of the cutter end of the scoop.

Figure 7 is a fragmentary plan view partly in horizontal section showing other details of the machine.

Similar reference characters indicate corresponding parts throughout the several views in the drawings.

Referring to the drawings in detail, the machine comprises a wagon box-like body 10 having an open bottom 11, closed sides 12 and a closed rear end 13, respectively, the top of the body being also open and this body swings upon an axle 14 to which are fixed ground or traction wheels 15 arranged at opposite sides of the body 10. At the front end of the body 10 is a yoke 16 which is united therewith in any suitable manner and at the top of the same has a forwardly extending open draft beam 17 which is slightly upwardly arched and at its forward end is provided with a hitch 18 of any conventional kind. The forward end of the beam 17 is equipped with a caster wheel 19, its fork 20 being swiveled in said beam and this wheel 19 travels upon the ground at the extreme front end of the machine.

Carried forwardly from the front end of the body 10 is a wheeled vertically swinging shovel or scoop 21 which has a fowardly sloped bed 22 and is fitted at its front end with saw toothed shaped cutters 23, these being located between mold boards 24 at opposite sides of said shovel or scoop. The shovel or scoop 21 swings upon the body 10 as later described. The wheels 26 of this shovel or scoop are journaled on stud axles 27 at opposite sides of the scoop or shovel and carried thereby in any suitable manner. The wheels 26 are adapted to travel in the sub-bed of the soil during the activity of the cutters 23 which excavate the soil when the scoop or shovel is in lowered position. The end of the scoop or shovel 21 next to the body 10 at the lower portion thereof has an abutment 29 for engaging a contact 28 on the forward end of said body, the abutment being engaged with the contact 28 when the scoop or shovel is in lowered working position and this limits the downward throw of said shovel or scoop relative to the body 10.

The scoop or shovel at the upper portion or top thereof has lift arms 30 which at their rear ends are pivoted to the body 10 by rollers 31 working within arcuate slots 32 formed in the yoke 16 while at their forward ends are pivotally connected turn buckle hangers 33, these being swung from a tie rod 34 vertically slidable in guides 35 and such tie rod is controlled by a hydraulic lift 36 so that the shovel or scoop can be lifted clear of the ground, this being required when making a turn during the draft of the machine. The hydraulic lift 36 is of any standard construction and operated in any desirable manner. Above the cutters 23 are colters 37, the axle 38 therefor being journaled in extensions 39 on the forward end of the shovel or scoop. When the shovel or scoop 21 is in lowered working position these colters 37 coact to cut into the soil as is clearly shown in Figure 2 of the drawings and thus aid in the loosening of such soil for subsequent pulverizing thereof.

Fixed on the axle 25 are sprockets 40 over which are trained endless sprocket chains 41, these being also trained over sprockets 42 fixed to the wheels 26. The axle 25 constitutes a driver for an endless conveyor 43 arranged within the scoop or shovel 21 and over its bed 22, the conveyor 43 being also trained over an idler 44 suitably journaled in the said shovel or scoop and the purpose of this conveyor is to hoist or lift the cut soil and deliver it into the body 10 onto an endless sifter and distributor belt, apron or the like 45 driven from sprockets 46 and 47, respectively, these being fixed to shafts 48 which have the gears 49 meshing with power gears 50 fixed to the axle 14. Between the upper and lower stretches of the belt or apron 45 are the rotatable clod breakers 51, they being in series and certain of these are carried by the axles for the gears 49 and the axle for the wheels 15 while the remaining clod breaker 51 is fixed to an axle 52 carrying the gear 53 meshing with the gear 49 next thereto so that these breakers 51 rotate severally in reverse directions to each other. The belt, apron or the like 45 is supported at one end by idler sprockets 54 while the other end is supported by the sprockets 46 and coacting with the said apron, belt or the like is a belt tightener 55. The depth of throw of the shovel or scoop 21 is regulated by the turn buckle hangers 33, these being manually adjustable.

When the machine is advanced in a field and the shovel or scoop 21 is in its lowered position the top soil will be dug and lifted onto the belt, apron or the like 45 whence it will be sifted and distributed between the breakers 51 for pulverizing of the clods and finally distributed upon the ground. In this manner the soil will be conditioned and pulverized for garden crop planting.

The machine can be drawn by a tractor or other draft medium.

The scoop or shovel 21 above the bed 22 thereof is closed as at 56 on opposite sides of the same.

Toward the rear of the body 10 at the open top thereof is a guard or shield 57 which prevents the load on the belt, apron or the like from passing out over the rear end of said body without becoming thoroughly pulverized by the action of the machine.

When the shovel or scoop 21 is elevated by the lift 36 the machine can make a turn in the field with dispatch and without retarding the turning movement of said machine.

What is claimed is:

1. A machine of the character described comprising a wagon box-like body having an open bottom and top, a pair of traction wheels supporting said body for swinging movement, a draft rigging extending forwardly from the body and having a front caster wheel, a forwardly inclined scoop arranged in said rigging for swinging movement relative to the body, traction wheels for said scoop, an elevator above said scoop and having driving connections with its wheels, and pulverizing mechanism arranged within the body and driven from its wheels.

2. A machine of the character described comprising a wagon box-like body having an open bottom and top, a pair of traction wheels supporting said body for swinging movement, a draft rigging extending forwardly from the body and having a front caster wheel, a forwardly inclined scoop arranged in said rigging for swinging movement relative to the body, traction wheels for said scoop, an elevator above said scoop and having driving connections with its wheels, pulverizing mechanism arranged within the body and driven from its wheels, and saw teeth-like cutters at the forward end of the scoop.

3. A machine of the character described comprising a wagon box-like body having an open bottom and top, a pair of traction wheels supporting said body for swinging movement, a draft rigging extending forwardly from the body and having a front caster wheel, a forwardly inclined scoop arranged in said rigging for swinging movement relative to the body, traction wheels for said scoop, an elevator above said scoop and having driving connections with its wheels, pulverizing mechanism arranged within the body and driven from its wheels, saw teeth-like cutters at the forward end of the scoop, and hydraulic means for lifting said scoop.

4. A machine of the character described comprising a wagon box-like body having an open bottom and top, a pair of traction wheels supporting said body for swinging movement, a draft rigging extending forwardly from the body and having a front caster wheel, a forwardly inclined scoop arranged in said rigging for swinging movement relative to the body, traction wheels for said scoop, an elevator above said scoop and having driving connections with its wheels, pulverizing mechanism arranged within the body and driven from its wheels, saw teeth-like cutters at the forward end of the scoop, hydraulic means for lifting said scoop, and means for varying the lifting action between the hydraulic means and said scoop.

5. A machine of the character described comprising a wagon box-like body having an open bottom and top, a pair of traction wheels supporting said body for swinging movement, a draft rigging extending forwardly from the body and having a front caster wheel, a forwardly inclined scoop arranged in said rigging for swinging movement relative to the body, traction wheels for said scoop, an elevator above said scoop and having driving connections with its wheels, pulverizing mechanism arranged within the body and driven from its wheels, saw teeth-like cutters at the forward end of the scoop, hydraulic means for lifting said scoop, means for varying the lifting action between the hydraulic means and said scoop, and colters above the cutter and carried by said scoop.

6. A machine of the character described comprising a wagon box-like body having an open bottom and top, a pair of traction wheels supporting said body for swinging movement, a draft rigging extending forwardly from the body and having a front caster wheel, a forwardly inclined scoop arranged in said rigging for swinging movement relative to the body, traction wheels for said scoop, an elevator above said scoop and having driving connections with its wheels, pulverizing mechanism arranged within the body and driven from its wheels, saw teeth-like cutters at the forward end of the scoop, hydraulic means for lifting said scoop, means for varying the lifting action between the hydraulic means and said scoop, colters above the cutter and carried by said scoop, and abutments on the body and scoop for limiting the downward movement of the latter with relation to said body.

7. A machine of the character described comprising a wagon box-like body having an open bottom and top, a pair of traction wheels supporting said body for swinging movement, a draft rigging extending forwardly from the body and having a front caster wheel, a forwardly inclined scoop arranged in said rigging for swinging movement relative to the body, traction wheels for said scoop, an elevator above said scoop and having driving connections with its wheels, pulverizing mechanism arranged within the body and driven from its wheels, saw teeth-like cutters at the forward end of the scoop, hydraulic means for lifting said scoop, means for varying the lifting action between the hydraulic means and said scoop, colters above the cutter and carried by said scoop, abutments on the body and scoop for limiting the downward movement of the latter with relation to said body, and a shield in the open top of the body rearwardly with respect to the pulverizing mechanism.

8. A machine of the character described comprising a wagon box-like body having an open bottom and top, a pair of traction wheels supporting said body for swinging movement, a draft rigging extending forwardly from the body and having a front caster wheel, a forwardly inclined scoop arranged in said rigging for swinging movement relative to the body, traction wheels for said scoop, an elevator above said scoop and having driving connections with its wheels, pulverizing mechanism arranged within the body and driven from its wheels, saw teeth-like cutters at the forward end of the scoop, hydraulic means for lifting said scoop, means for varying the lifting action between the hydraulic means and said scoop, colters above the cutter and carried by said scoop, abutments on the body and scoop for limiting the downward movement of the latter with relation to said body, a shield in the open top of the body rearwardly with respect to the pulverizing mechanism, and mold boards on the scoop at opposite ends of the series of cutters.

9. A machine of the character described comprising a wagon box-like body having an open bottom and top, a pair of traction wheels supporting said body for swinging movement, a draft rigging extending forwardly from the body and having a front caster wheel, a forwardly inclined scoop arranged in said rigging for swinging movement relative to the body, traction wheels for said scoop, an elevator above said scoop and having driving connections with its wheels, pulverizing mechanism arranged within the body and driven from its wheels, saw teeth-like cutters at the forward end of the scoop, hydraulic means for lifting said scoop, means for varying the lifting action between the hydraulic means and said scoop, colters above the cutter and carried by said scoop, abutments on the body and scoop for limiting the downward movement of the latter with relation to said body, a shield in the open top of the body rearwardly with respect to the pulverizing mechanism, mold boards on the scoop at opposite ends of the series of cutters, and breaker rollers coacting with said pulverizing mechanism within the body.

10. A machine of the character described comprising a wagon box-like body having an open bottom and top, a pair of traction wheels supporting said body for swinging movement, a draft rigging extending forwardly from the body and having a front caster wheel, a forwardly inclined scoop arranged in said rigging for swinging movement relative to the body, traction wheels for said scoop, an elevator above said scoop and having driving connections with its wheels, pulverizing mechanism arranged within the body and driven from its wheels, saw teeth-like cutters at the forward end of the scoop, hydraulic means for lifting said scoop, means for varying the lifting action between the hydraulic means and said scoop, colters above the cutter and carried by said scoop, abutments on the body and scoop for limiting the downward movement of the latter with relation to said body, a shield in the open top of the body rearwardly with respect to the pulverizing mechanism, mold boards on the scoop at opposite ends of the series of cutters, breaker rollers coacting with said pulverizing mechanism within the body, and a hitch at the forward end of said draft rigging.

WILLIAM E. PRYOR.
JAMES S. PRYOR.
EDWARD J. PRYOR.